Oct. 22, 1957  K. M. HUTGENS  2,810,836
APPARATUS FOR IRRADIATING MATERIALS
WITH MEASURED QUANTITIES OF LIGHT

Filed April 6, 1954  2 Sheets-Sheet 1

INVENTOR
KAREL MARIA HUTGENS
BY
*Pollard, Johnston, Smythe & Robertson*
ATTORNEYS Oct. 22, 1957     K. M. HUTGENS     2,810,836
APPARATUS FOR IRRADIATING MATERIALS
WITH MEASURED QUANTITIES OF LIGHT
Filed April 6, 1954     2 Sheets-Sheet 2
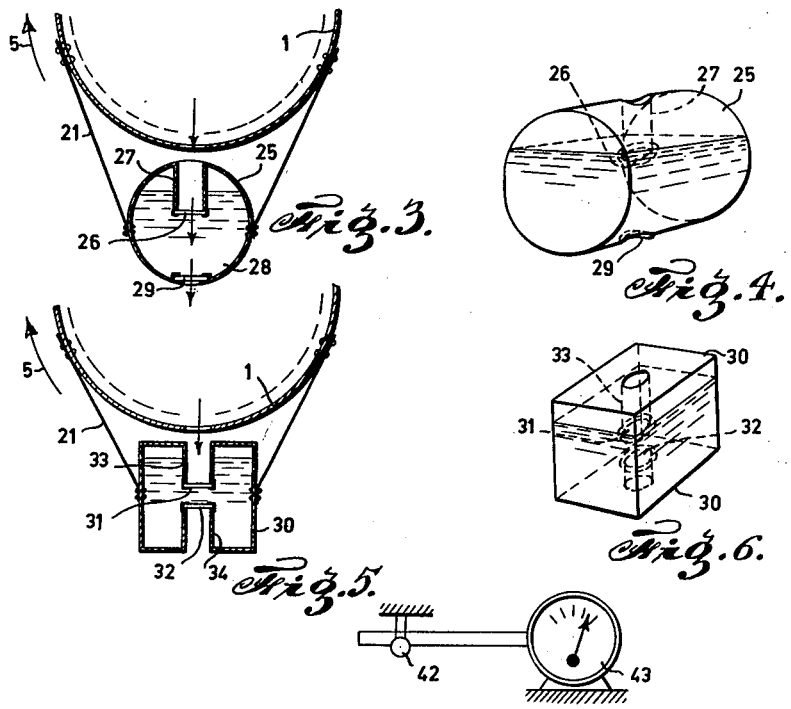
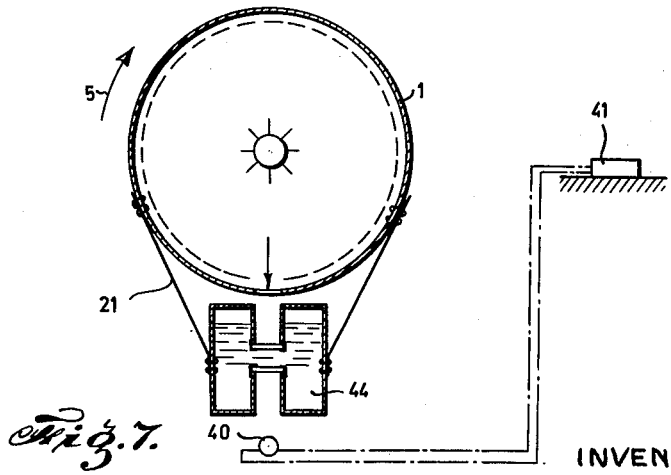
INVENTOR
KAREL MARIA HUTGENS
BY
ATTORNEYS

United States Patent Office 2,810,836
Patented Oct. 22, 1957

---

2,810,836

APPARATUS FOR IRRADIATING MATERIALS WITH MEASURED QUANTITIES OF LIGHT

Karel Maria Hutgens, Venlo, Netherlands, assignor to Chemische Fabriek L. van der Grinten N. V., Venlo, Netherlands, a company of the Netherlands Application April 6, 1954, Serial No. 421,415

Claims priority, application Netherlands April 10, 1953

11 Claims. (Cl. 250—52)

The invention is concerned with an apparatus for irradiating materials with measured quantities of light, comprising a cylindrical structure adapted to be rotated about its axis, a light source being arranged in a stationary position within said cylindrical structure, and the inner wall of the said structure being provided, within the area struck by the light rays emanating from the light source, with means for locating the materials to be irradiated.

Apparatus of this type, in which the cylindrical structure is mounted in a fixed position or for rotation about a vertical axis, are known for the determination of testing of the fastness to light of colours of textile samples ("Fadeometer"; Atlas Electric Devices, Chicago, U. S. A., as described in American Dyestuff Reporter, volume 38, August 8, 1949, pages 571–574 and page 593; "Fugitometer," Kelvin, Bottomley and Baird Limited, London, as described in "Mededeling van het Vezelinstituut T. N. O. No. 76 door H. J. Selling Math. Drs.," pages 14 and 15). The irradiations necessary for the determination of this fastness to light are of the order of magnitude of between 5 and 200 hours' irradiation in direct sunlight in summer at sea-level at latitudes of approximately 45°. The quantities of light are measured by means of standard samples of known light-fastness.

Measurements of relatively much smaller quantities of light have been carried out by means of light-sensitive layers as described in German patent specification No. 117,599 and Dutch patent specification No. 44,228, whilst measurements of larger quantities of light have, for certain purposes, been achieved in similar arrangements with the aid of liquids which, upon exposure to light, undergo a change of their absorptive power for light (compare: "Strahlen-Therapie," 1930, page 378 and "Licht und Lampe," 1931, page 184 and (for smaller quantities again) Dutch patent specification No. 44,228).

In these measurements photoelectric elements were used.

The methods referred to were used, not only for measuring the light by means of a galvanometer connected to the photoelectric element, but also for determining a measured quantity of the irradiation, the photoelectric element actuating in one form or another an acoustic or other signal, or a switch or shutter, after the light-sensitive material or the light-sensitive liquid had, by the action of a given quantity of light thereon, undergone a given change in its absorptive power for light.

Although—as appears from the literature referred to above—other light-sensitive liquids can successively be used, certain light-sensitive diazo compounds, as described in Dutch patent specification No. 44,228, have proved to be particularly suitable for the purpose, and in the following description of the apparatus according to the invention and of its method of operation, reference is mainly made to the use of an aqueous solution of one suitable diazo compound only, viz. para-diazo-ortho-chloro-dimethylaniline, mentioned in Netherlands patent specification No. 44,228, and which hereinafter will be simply referred to as the "diazo compound." This is done for simplicity's sake, but is not to be regarded as limiting the scope of the claims.

According to the present invention, the axis of the cylindrical structure of an apparatus of the character first mentioned hereinabove has a horizontal or substantially horizontal position, and the cylindrical structure carries, for rotation therewith, a liquid cell adapted to contain a light-sensitive liquid; the said liquid cell is located in the path of the light rays emanating from the light source, and it has walls or windows which are pervious to said light rays; and a photoelectric element is arranged in the path of the light rays leaving the liquid cell.

Apparatus according to the present invention enables the determination of a measured quantity of irradiation, of the order of magnitude necessary for determining the fastness to light of textile samples as stated above, with a degree of accuracy hitherto unknown.

Various embodiments of the invention are illustrated in the drawing in which:

Figure 3 is a detail, comprising the liquid cell shown in section, of a third embodiment.

Figure 4 is a perspective view of the liquid cell used according to Figure 3.

Figures 5 and 6 show, in the same manner as Figures 3 and 4, another form of liquid cell.

Figure 7 illustrates diagrammatically an apparatus comprising two photoelectric elements.

Figure 1:
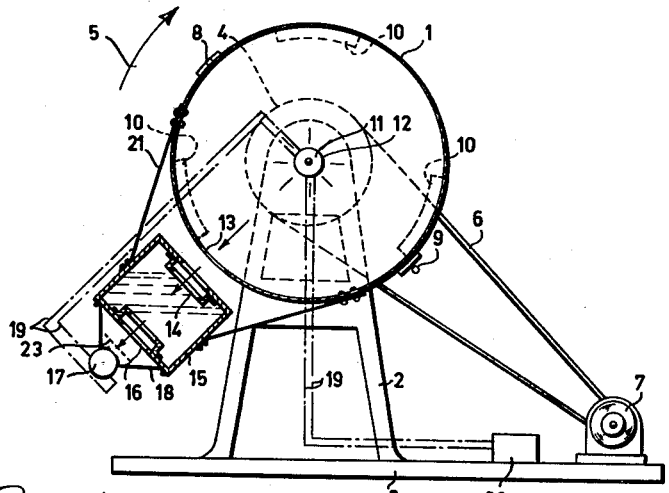
Figure 1 is an elevation, partly in section, of an apparatus constructed according to the invention.

The apparatus illustrated in Fig. 1 comprises a sheet metal cylindrical drum 1, mounted for rotation about its horizontally arranged axis. By means of trunnions (not shown) it is supported on standards 2 mounted on a base plate 3. The drum is provided with a pulley 4, by means of which it may be rotated in the direction of the arrow 5, with the aid of a rope or belt 6, by an electric motor 7 mounted on the base plate 3. The drum may be opened so as to give access to its interior, and for this purpose it is provided with a hinge 8 and locking means 9.

The inner wall of the drum 1 is provided with means for locating and fastening the materials 10, such as textile samples, which it is required to irradiate.

On the centre line of the drum 1 is mounted a tubular lamp 11 in a stationary position. When the drum 1 is slowly and continuously rotated, the samples 10 are evenly irradiated.

The lamp 11 may be a horizontally mounted water-cooled super-high-pressure mercury-vapour tube of the type "for undirected radiation" of the requisite length relative to the length of the drum 1, taking into consideration its radius, so that the inner surface of the drum and the samples fastened thereon will be evenly irradiated. Around the lamp 11 there is mounted a light-pervious jacket 12, preferably made of clear glass, which affects the emission spectrum of the mercury vapour lamp in such a way as to give bleaching and discoloration effects approximately equivalent to those brought about by sunlight. This can be substantially achieved when the glass jacket 12 transmits light rays as follows:

5770 A. U.—approximately 93%
5460 A. U.—approximately 93%
4360 A. U.—approximately 91%
4050 A. U.—approximately 91%
3650 A. U.—approximately 83%
3350 A. U.—approximately 28%
3130 A. U.—approximately 1%
3020 A. U.—approximately 0.4%

At 13 the drum 1 has an opening through which the light rays pass. They then pass through the window 14 of a liquid cell 15 as indicated by the arrows. They subsequently pass through the liquid in the cell 15 and leave again through the window 16, falling then upon the photoelectric element 17. The liquid cell 15 is fastened to the drum 1 by means of the suports 21, while the photoelectric element 17 is fastened to the cell 15 by means of the supports 18.

The cell 15 is not completely filled with liquid. When the drum 1 rotates, the level of the liquid in the cell 15 remains horizontal, said liquid level thus continually changing its position relative to the cell 15.

The liquid cell 15 is of rectangular shape, and owing to this the liquid, by rotation of the drum, is thoroughly mixed and stirred all the time, and thus kept homogeneous.

The liquid in the cell 15 is an aqueous solution of the diazo compound. Light rays of a wavelength of between 4500 and 3500 A. U. passing through it will be strongly absorbed, and only light of other wavelengths will fall upon the photoelectric element 17. This photoelectric element 17 is provided with means for making it respond substantially only to wavelengths of, say, approximately 4000 A. U., and will not therefore be activated when it is struck by other wavelengths.

The light which, in all positions of the cell 15 during rotation of the drum 1, is invariably absorbed by the liquid, will gradually decompose the diazo compound, and thus the liquid will gradually lose its absorptive power for the above-mentioned light rays of 3500 A. U.–4500 A. U. The liquid in the cell 15 will be thoroughly stirred all the time owing to the rotation of the drum 1, so that from beginning to end it will be kept homogeneous.

The concentration of the diazo compound in the liquid can be so chosen that the light rays, which continuously enter the cell 15 through the window 14, will have effected substantially complete decomposition at the moment at which the materials 10 will have received the desired irradiation, which naturally depends on the samples to be tested and on the effects to be obtained. For an irradiation equivalent to, for example, ten hours of broad sunlight, when the diameter of the drum 1 is, say, 36 cm. and when the lamp has an input of 500 watts, the apparatus will have to be in operation for approximately ten hours, and the diazo concentration can be adjusted thereto. When the drum 1 makes one revolution per minute, it will have made six hundred revolutions in ten hours, and this will naturally have brought about a thorough stirring of the liquid in the cell 15 during the entire photochemical reaction. As will be obvious, the liquid should not completely fill the cell 15, because the stirring effect would not then be obtained. The diazo compound, upon its photodecomposition, produces nitrogen. The liquid is therefore preferably made up with gas-free water, while the diazo compound is dissolved therein in such a concentration that the quantity of nitrogen produced will be insufficient to saturate the liquid. When, for this reason, a low concentration of the diazo compound must be employed which cannot be adjusted to a suitable value, for example, for a relatively large irradiation of the materials 10, a diaphragm or "stop" may be mounted in the opening 13 of the drum 1. By means of this diaphragm the quantity of light falling into the cell can be limited and the irradiation of the cell thus adjusted. When the photoelectric element responds to light rays of wavelengths other than those within the absorption spectrum of the diazo compound, a light-filter 23 (diagrammatically illustrated in Figure 1 by dotted lines only), which only transmits the rays for which the diazo compound has great absorption, may be mounted between the window 16 and the photoelectric element 17. When at the end of the irradiation the diazo compound is decomposed, and the liquid in the cell 15 has in consequence become pervious to these rays, the photoelectric element 17 will start emitting an electric current, which can be used for actuating a switch device for interrupting the current at least to the light source. In this way the apparatus will stop itself, and will thus have applied a predetermined measured quantity of irradiation to the materials 10.

Instead of a solution of a diazo compound as hereinbefore described, use may also be made of other solutions, which have considerable absorption for rays of certain wavelengths, which absorption is decreased upon irradiation as a result of photochemical reaction (as with the diazo compounds). An example of such a solution is a slightly acidified solution of ferric ammonium oxalate. The photoelectric element and/or the light-filter will naturally have to be adjusted to the absorption spectrum of the chosen solution, just as they have to be adjusted, as described above, to the absorption spectrum of the diazo compound.

Referring again to Figure 1, the current generated by the photoelectric element 17 is led by means of wires 19 and sliding contacts (not shown), to the relay 20, which relay is arranged, on operation, to break the electric circuit of the lamp 11. These connections are shown only diagrammatically.

The materials to be irradiated are thus treated with a measured quantity of light, and this measured quantity is determined with great accuracy. Provided the diazo concentration in the liquid in the cell 15, and the quantity of this liquid, and/or the diaphragm (referred to above) have been correctly adjusted, the irradiation can be carried out with a measured quantity of light with an accuracy of a fraction of one per cent.

In the apparatus according to Figure 1, the current produced by the photoelectric element 17 at the end of the irradiation operation is conducted to the switch device 20, but it may also be conducted to a galvanometer, to an acoustic signal, and/or to a light signal.

In the embodiment of the apparatus according to Fig. 1 the photoelectric element 17 is mounted on the cell 15 and therefore rotates with the drum 1.

Figure 2:
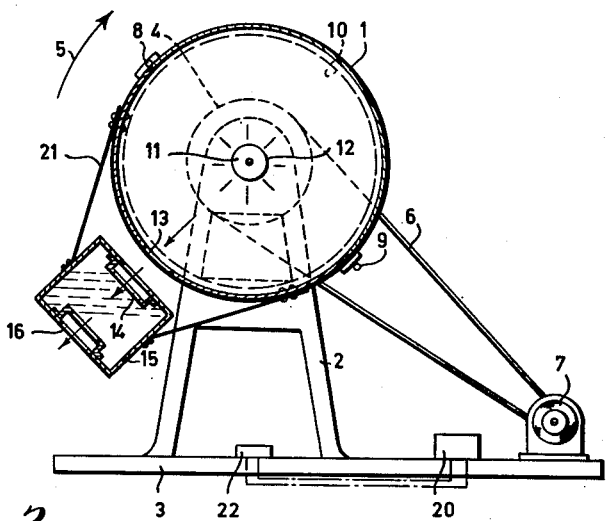
Figure 2 is a similar view of another embodiment of the invention.

It may, however, be stationary in the apparatus, whilst the drum and the cell rotate. This embodiment is illustrated in Figure 2. The photoelectric element is here denoted, by the numeral 22 and is fixedly mounted on the base plate 3. All the other parts correspond to those in Figure 1, and are also designated by the same reference numbers.

The liquid in the cell 15 in Fig. 2 is of course stirred just as thoroughly as in the apparatus according to Fig. 1. Whereas, however, the photoelectric element 17 in Fig. 1 is under the continuous influence of the light, the photoelectric element 22 in Fig. 2 is struck by light from the lamp 11 only once during each revolution of the drum 1, during the short time when the window 16 is opposite the element 22. When the decomposition of the diazo compound in the liquid is nearly completed, the strength of the beam of light each time falling on the photoelectric element 22 will rapidly increase (as far as those rays are concerned for which the diazo compound initially had high absorption) and the short electric impulse then produced each time by the photoelectric element will ultimately become strong enough to actuate the switch device 20, thus achieving the same effect as in the embodiment according to Figure 1. The switch device 20 will thus interrupt the lamp current, in order to stop irradiation, and as a rule will also stop the motor 7, so that the whole of the apparatus will come to a standstill.

Experiments have already shown that although the photoelectric element 22 in the apparatus according to Fig. 2 is struck by the light only once during each revolution of the drum 1, this will not appreciably affect the accuracy of the dosage of the light, because as a rule the total number of revolutions is high when e. g. samples of textile materials are irradiated. As already explained above, a number of revolutions of the order of magnitude of 600 is involved in one irradiation, so that if, for example, the diazo concentration should have decreased to the strength at which the beam of light might activate the photoelectric element 22 sufficiently to actuate the switch device 20 at a moment when, say, three quarters of a revolution of the drum 1 would still be required before the light strikes the element 22 again, then the accuracy will be affected by no more than $$\tfrac{3}{4} \times \tfrac{1}{600} = 1:800$$

i. e. a little over one-tenth percent.

The advantage of the apparatus according to Fig. 2 over that illustrated in Fig. 1 is that no sliding contacts for the electric current are necessary.

The agitation of the liquid in the apparatus illustrated in Figs. 1 and 2 is largely due to the fact that the liquid cell 15 has a rectangular shape. It is, however, possible to obtain the same results by having the windows of the liquid cell projecting into the interior of the cell, so that they act as stirring members. This is illustrated in Figs. 3–6. The liquid cell may have a cylindrical form, as illustrated in Fig. 4. It is clear that such a cylindrical cell 25 in itself can have no effective stirring effect on the liquid content when the cell is rotated with the drum 1. The window 26 (see especially Fig. 3) is now at the end of a tube 27 extending into the liquid 28 in the cell 25. The other window 29, as usual, is provided in the wall of the liquid cell, opposite the window 26. It will be obvious that if the cell 25 instead of the cell 15 is mounted in an apparatus according to Fig. 1 or 2, the liquid 28 in the cell will be effectively stirred by means of the tube 27 with the window 26 during the rotation of the drum 1. Window 26 always remains in contact with the liquid 28, and thus there will not be any reflection losses in the light penetrating through the window 26 into the liquid 28. Such reflection losses are inevitable in liquid cells such as 15 in Figs. 1 and 2. Inaccuracies caused by reflections of the light in apparatus as illustrated in Figs. 1 and 2 are avoided when cells of the kind illustrated in Fig. 3, and also in Figs. 5 and 6 are used.

In the apparatus according to Figs. 5 and 6 (Fig. 6 is a perspective view of the liquid cell 30 used in the arrangement according to Fig. 5) the liquid cell 30 has a rectangular cross-section, and therefore has the same stirring effect upon the liquid as the liquid cells 15 of Figs. 1 and 2. In addition, however, both windows 31 and 32 penetrate into the liquid, because they are mounted at the ends of the tubes 33 and 34.

This form of liquid cell ensures intensive stirring, and at the same time avoids reflection losses. This means a very high accuracy of measurement and dosage.

In the embodiment somewhat diagrammatically illustrated in Fig. 7, the apparatus comprises one photoelectric element 40 electrically connected to the switch 41 of the apparatus for interrupting at least the current to the light source, and in addition a second photoelectric element 42, which is connected to a galvanometer 43. The apparatus is otherwise similar to that according to Fig. 2. Each time the liquid cell 44 is opposite the element 42, an electric current will be indicated by the galvanometer 43. When, for example, a suitable light filter is used, the element 40 will respond to those rays for which the diazo compound has high absorption, and consequently this element 40 will be able to switch off the apparatus very sharply. The element 42, on the contrary, will have to respond to rays for which the diazo compound has relatively low absorption, for example to rays of 4900 A. U. The galvanometer will then gradually indicate greater and greater strength of current, thus showing that beams of light of increasing intensity fall on the element 42 each time the cell 44 passes the element 42. Thus on the galvanometer 43 one can read, during the entire operation of the apparatus, or at least during the last hours of its duration, how far the irradiation has proceeded, and from this an estimate can be formed of the amount of time that will still be required for the complete irradiation.

It is not essential that the light source be located in the axis of the drum 1. If it were eccentrically mounted, the irradiation of each of the samples 10 would be alternately stronger and weaker. This is to a certain extent an imitation of what will happen in nature, when clouds temporarily obscure the sun. It is not essential either that the axis about which the drum 1 rotates be strictly horizontal. Provided the axis be not vertical, in which case the automatic stirring of the liquid in the liquid cells would not occur, the axis may also have other positions. The horizontal position naturally produces the best stirring effect, and there is no reason to assume that a position greatly deviating therefrom would have any considerable advantage.

The apparatus according to the invention may naturally be combined with the usual means for conditioning the atmosphere of the samples. The space inside the drum 1 can be fitted for air circulation, which air may pass, for example, over a liquid surface, the air thus acquiring a certain moisture content. The air may likewise be passed along a thermostat and along a heating element controlled by said thermostat, so that a constant temperature may be obtained in the apparatus.

The invention has been described above with reference to the "diazo compound," and it should be pointed out that numerous other diazo compounds having suitable absorption spectra can be used in the same manner for the purposes of the invention. Other light-sensitive substances and light-sensitive mixtures, may also be used, including light-sensitive mixtures which will not cause the liquid in the cells to become more and more pervious to light upon exposure, but on the contrary become more and more opaque to such light during irradiation. However, when such a liquid is used, the photoelectric element used for controlling the switching off of the apparatus should not be stationary, but, as in Figure 1, should have a fixed position relative to the liquid cell and rotate therewith, because a reaction will in that case occur when the strength of current falls below a given minimum.

What I claim is:

1. An apparatus for irradiating goods with dosed quantities of light, comprising a rotary hollow holder for the goods to be irradiated, means mounting said holder for rotation about an axis inclined at a substantial angle to the vertical, a light source within said holder and about which it rotates, said holder comprising means for holding the goods to its periphery in the path of light from said source so that it will carry the goods about said source under continued exposure to such light, and a container for holding in the path of such light a body of liquid having a light aborbing capacity that changes with its irradiation, said container being carried by said holder for rotation therewith about said axis and comprising a window pervious to light rays from said source for transmitting such rays into the liquid held in said container.

2. An apparatus for irradiating goods with dosed quantities of light, comprising a rotary hollow holder for the goods to be irradiated, means mounting said holder for rotation about an axis inclined at a substantial angle to the vertical, a light source within said holder and about which it rotates, said holder comprising means for holding the goods to its periphery in the path of light from said source so that it will carry the goods about said source under continued exposure to such light, and a container for holding in the path of such light a body of liquid having a light absorbing capacity that changes with its irradiation, said container being carried by said holder for rotation therewith about said axis and comprising a window pervious to light rays from said source for transmitting such rays into the liquid held in said container, said container being internally non-circular in the vertical direction whereby it continuously agitates the liquid held in it as it is rotated about said axis.

3. An apparatus for irradiating goods with dosed quantities of light, comprising a rotary hollow holder for the goods to be irradiated, means mounting said holder for rotation about an axis inclined at a substantial angle to the vertical, a light source within said holder and about which it rotates, said holder comprising means for holding the goods to its periphery in the path of light from said source so that it will carry the goods about said source under continued exposure to such light, and a container for holding in the path of such light a body of liquid having a light absorbing capacity that changes with its irradiation, said container being carried by said holder for rotation therewith about said axis and comprising spaced windows respectively pervious to light rays from said source for transmitting such light rays respectively into and from the liquid held in said container.

4. An apparatus as described in claim 3, at least one of said windows being disposed within the space occupied by such liquid, on a hollow wall portion of said container projecting from the periphery thereof into said space in a direction radial to said axis.

5. An apparatus for irradiating goods with dosed quantities of light, comprising a rotary hollow holder for the goods to be irradiated, means mounting said holder for rotation about an axis inclined at a substantial angle to the vertical, a light source within said holder and about which it rotates, said holder comprising means for holding the goods to its periphery in the path of light from said source so that it will carry the goods about said source under continued exposure to such light, and a container for holding in the path of such light a body of liquid having a light absorbing capacity that changes with its irradiation, said container being carried by said holder for rotation therewith about said axis and having the form of a parallelepiped comprising parallel windows in opposite side walls thereof, said windows respectively lying across the path of and being pervious to light rays from said source so that they will transmit such light rays respectively into and from the liquid held in said container.

6. An apparatus for irradiating goods with dosed quantities of light, comprising a rotary hollow holder for the goods to be irradiated, means mounting said holder for rotation about an axis inclined at a substantial angle to the vertical, a light source within said holder and about which it rotates, said holder comprising means for holding the goods to its periphery in the path of light from said source so that it will carry the goods about said source under continued exposure to such light, a container for holding in the path of such light a body of liquid having a light absorbing capacity that changes with its irradiation, said container being carried by said holder for rotation therewith about said axis and comprising inner and outer windows spaced apart on a radius from said axis and respectively pervious to light rays from said source for transmitting such light rays respectively into and from the liquid held in said container, and light-sensitive means mounted in the path of and reactive to such light rays transmitted through said outer window for indicating an intensity thereof.

7. An apparatus as described in claim 6, said light-sensitive means comprising a photoelectric cell mounted in a fixed position in the path of rotation of such light rays transmitted through said outer window.

8. An apparatus for irradiating goods with dosed quantities of light, comprising a rotary hollow holder for the goods to be irradiated, means mounting said holder for rotation about an axis inclined at a substantial angle to the vertical, a light source within said holder and about which it rotates, said holder comprising means for holding the goods to its periphery in the path of light from said source so that it will carry the goods about said source under continued exposure to such light, a container holding in the path of such light a body of liquid having a light absorption capacity that changes with the extent of irradiation thereof, said container being carried by said holder for rotation therewith about said axis and comprising inner and outer windows spaced apart in a direction radial to said axis and respectively pervious to light rays from said source for transmitting such light rays respectively into and from said liquid, and light-sensitive means mounted in the path of and reactive to light rays transmitted through said liquid for indicating an intensity thereof.

9. An apparatus as described in claim 8, said liquid having an absorbing capacity for light of certain wave lengths that decreases with the extent of its exposure thereto, and said light-sensitive means being substantially more reactive to light of said certain wave lengths than to light of other wave lengths.

10. An apparatus as described in claim 8, said liquid having an absorbing capacity for light of certain wave lengths that decreases with the extent of its exposure thereto, and a light filter located in the path of light rays transmitted from said liquid to said light-sensitive means, said filter being substantially pervious only to light of said certain wave lengths.

11. An apparatus as described in claim 8, said liquid having an absorbing capacity for light of certain wave lengths that decreases with the extent of its exposure thereto, said light-sensitive means comprising two photoelectric cells mounted in fixed positions in the path of rotation of light rays transmitted through said liquid, means rendering one of said cells selectively reactive to light of said certain wave lengths, means responsive to a reaction of said one cell for determining the end point of the exposure, and means responsive to reactions of said other cell for indicating the progress of the irradiation.

References Cited in the file of this patent
UNITED STATES PATENTS
1,458,941     Jameson _____ June 19, 1923